United States Patent [19]  [11] 4,159,260
Jones et al.  [45] Jun. 26, 1979

[54] DISPERSIBLE STARCH GRAFT COPOLYMER BLEND

[75] Inventors: Duane A. Jones, Minneapolis; Lyle F. Elmquist, North St. Paul, both of Minn.

[73] Assignee: Henkel Corporation, Minneapolis, Minn.

[21] Appl. No.: 854,294

[22] Filed: Nov. 23, 1977

[51] Int. Cl.$^2$ ............................................. C08L 3/00
[52] U.S. Cl. ..................... 260/17.4 GC; 260/17.4 ST
[58] Field of Search ................. 260/17.4 GC, 17.4 ST

[56] References Cited

U.S. PATENT DOCUMENTS

| 3,669,915 | 6/1972 | Jones et al. | 260/17.4 GC |
| 4,066,495 | 1/1978 | Voigt et al. | 260/17.4 ST |
| 4,069,177 | 1/1978 | Smith | 260/17.4 GC |

Primary Examiner—M. J. Welsh
Attorney, Agent, or Firm—Patrick J. Span; Elizabeth Tweedy

[57] ABSTRACT

A blend of hydrolyzed polyacrylonitrile-starch graft copolymer and a fatty quaternary ammonium chloride which exhibits good wicking and dispersing properties.

6 Claims, No Drawings

[4,159,260]

DISPERSIBLE STARCH GRAFT COPOLYMER BLEND

STATEMENT OF THE INVENTION

This invention relates to a dispersible blend of hydrolyzed polyacrylonitrile-starch graft copolymer and a selected fatty quaternary ammonium chloride. More especially, this invention relates to a dispersible blend of hydrolyzed polyacrylonitrile-starch graft copolymer and a fatty quaternary ammonium chloride containing at least 18 carbon atoms.

BACKGROUND OF THE INVENTION

Starch-hydrolyzed polyacrylonitrile graft copolymers exhibiting the capacity to absorb from about 300 to 1,000 times their weight of deionized water are known at this time. The development of these compositions was carried out by the Northern Regional Research Laboratory, Peoria, Illinois. The starch-hydrolyzed polyacrylonitrile graft copolymer is produced by exposure of starch, either gelatinized or ungelatinized, to cerium salt, such as cerium ammonium nitrate, which acts as a catalyst to generate free radicals. Acrylonitrile is then added. Polyacrylonitrile chains form at the site of these free radicals on the starch molecule. The resulting material is then saponified in sodium hydroxide to hydrolyze the polyacrylonitrile chains to carboxamide and alkali metal carboxylate groups mixed with metal salts. After drying, the material can absorb about 300 to 400 times its weight. Drying can be accomplished by drum, tumble air or vacuum drying. Extraction of the copolymer dispersion with alcohol before drying provides a material with fluid absorbency of 800 to 1,000 times its weight. The fluid absorbency is determined by suspending a weighed amount of dry copolymer in an excess of testing fluid and filtering to recover unabsorbed fluid.

The copolymer can be made as film, flakes, powder or mat. These forms take up water, swelling but not dissolving, and hold it in expanded duplications of their own dry shapes. Films extend and thicken to sheets. Powders become piles of water textured like crushed ice. A flake expands to a clear, angular piece of water. The swollen forms shrink in dilute acid and expand again in dilute alkali solution. They also shrink as they dry and expand again with water.

The copolymer, with these properties, can be mixed with or coated on a wide variety of materials including, for example, sand, straw, sawdust, seeds and roots, natural or synthetic fibers, and flour, gelatin and starch. It can hold water in soils, animal bedding and kitty litter, toweling and diapers, bandages, surgical pads and dental absorbents.

One disadvantage of the product is that when it is dispersed without vigorous agitation or without any agitation, the copolymer then wets on the outside of the particles and forms a layer which blocks further penetration of water. For example, when powdered copolymer is poured into a container holding water, the copolymer settles to the bottom forming gumballs or a block of material which is neither distributed nor dispersed in the media. In applications in which dry copolymer is used as an absorbent, this lack of wetting in a stationary position can completely negate the copolymer's usefulness. Stationary uses include absorbents for diapers, feminine hygiene napkins or tampons, bandages and the like.

Fatty quaternary ammonium chlorides are commercially available. These compounds are prepared by reacting a fatty amine with methyl chloride. Primary fatty amines yield the fatty trimethyl ammonium chlorides, secondary fatty amines produce difatty dimethyl ammonium chlorides and the tertiary fatty amines produce trifatty methyl ammonium chlorides. The structural formula for a fatty quaternary ammonium chloride is as follows:

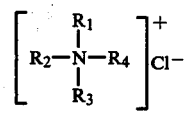

wherein $R_1$, $R_2$, $R_3$ and $R_4$ are hydrogen or alkyl radicals with the proviso that there is at least one alkyl radical in the molecule.

SUMMARY OF THE INVENTION

It has now been found that blending of the hydrolyzed polyacrylonitrile-starch graft copolymer with a fatty quaternary ammonium chloride containing at least 18 carbon atoms allows the resulting material to disperse in water even though no agitation is applied. Preferably, about 2.5% to 20% by weight of the fatty quaternary ammonium chloride based upon the dry weight of the copolymer is used, and most preferably, about 10% to 20% by weight of the fatty quaternary ammonium chloride based upon the dry weight of the copolymer is used. The quaternary ammonium chloride compounds containing at least 18 carbon atoms not only produce dispersible blends but one which displays "wicking." Included among the fatty quaternary ammonium chloride useful in the practice of this invention are dimethyl di(hydrogenated tallow) quaternary ammonium chloride, trimethyl tallow quaternary ammonium chloride, dimethyl dicoco quaternary ammonium chloride, and monococo trimethyl quaternary ammonium chloride.

DETAILS OF THE INVENTION

Blends of fatty quaternary ammonium chloride and the hydrolyzed polyacrylonitrile-starch graft copolymer can be prepared by dry blending. They can also be prepared by slurrying the hydrolyzed polyacrylonitrile-starch graft copolymer in a selected solvent in which is dissolved the fatty quaternary ammonium chloride. Water miscible and immiscible alcohols are useful as solvents in the practice of the invention. The only function of the solvent is to dissolve the fatty quaternary compound. The slurry subsequently is dried to produce the final blend. The copolymer used as the starting material usually has a particle size which passes through a 30 mesh U.S. standard screen. Optimum results were obtained using particle sizes between 30 mesh and 100 mesh U.S. standard screen.

The following specific examples illustrate the characteristics of the blend of hydrolyzed polyacrylonitrile-starch graft copolymer and fatty quaternary ammonium chloride. These examples are intended to illustrate the invention and not to limit the scope of the invention.

EXAMPLE I

The blends of hydrolyzed polyacrylonitrile-starch graft copolymer and fatty quaternary ammonium chloride shown below were made by dissolving the fatty quaternary ammonium chloride in methyl alcohol and adding the hydrolyzed polyacrylonitrile-starch graft copolymer thereto. The dispersions were then dried at least one hour in a vacuum oven at a temperature of 40° C. The proportions by weight used were ten parts hydrolyzed polyacrylonitrile-starch graft copolymer, eight parts methyl alcohol, and one-quarter to two parts fatty quaternary ammonium chloride. The hydrolyzed polyacrylonitrile-starch graft copolymer was ground so that all the material passes through a 30 mesh U.S. standard sieve. Of this material, the portion which would not pass through a 100 mesh U.S. standard sieve was classified as coarse and the portion passing through the 100 mesh U.S. standard sieve was classified as fine.

The resulting dry mixtures were tested for wicking properties by placing a small amount in a beaker and slowly adding deionized water. The speed at which the water wetted the material was noted. The resulting dry mixtures were tested for speed of dispersion by adding one gram of material to 200 ml deionized water in a beaker with moderate stirring and observing speed of dispersion.

The resulting dry mixture of one part by weight di(-hydrogenated tallow) dimethyl ammonium chloride and 10 parts by weight coarse hydrolyzed polyacrylonitrile-starch graft copolymer was tested as described above. The sample wicked quickly and dispersed quickly. The resulting dry mixture containing fine hydrolyzed polyacrylonitrile-starch graft copolymer did not wick nor did it disperse as well as the sample containing coarse copolymer.

The resulting dry mixtures containing one-quarter part, one-half part and two parts respectively of di(hydrogenated tallow) dimethyl ammonium chloride exhibited the following wicking and dispersing products.

| Name | % by weight of blend | Wicking | Dispersing |
|---|---|---|---|
| di(hydrogenated tallow) dimethyl ammonium chloride | 2.5 | fair | fair |
| di(hydrogenated tallow) dimethyl ammonium chloride | 5.0 | good | good |
| di(hydrogenated tallow) dimethyl ammonium chloride | 20.0 | very good | very good |

EXAMPLE II

Following the procedures set out in Example I, blends were prepared containing the following fatty quaternary ammonium chlorides in the amounts shown below, and coarse copolymer. The wicking and dispersing properties exhibited by each blend when tested as in Example I are also shown below.

| Fatty quaternary ammonium chloride | % by weight of blend | Wicking | Dispersion |
|---|---|---|---|
| Tallow trimethyl ammonium chloride | 10% | fair wicking | good |
| Dicoco dimethyl ammonium chloride | 10% | fair wicking | good |
| Monococo trimethyl quaternary ammonium chloride | 20% | wicked slowly | slowly |
| Tricaprylyl methyl ammonium chloride | 10% | slightly | good |

The embodiments of the invention in which an exclusive property or privilege is claimed are defined as follows:

1. A blend comprising hydrolyzed polyacrylonitrile-starch graft copolymer and about 2.5% to 20% by weight based on the blend, a fatty quaternary ammonium chloride containing at least 18 carbon atoms having the structural formula:

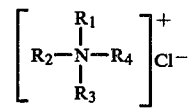

wherein $R_1$, $R_2$, $R_3$ and $R_4$ are hydrogen or alkyl radicals with the proviso that there is at least one alkyl radical in the molecule.

2. The blend of claim 1 wherein the fatty quaternary ammonium chloride is di(hydrogenated tallow) dimethyl ammonium chloride.

3. The blend of claim 1 wherein the fatty quaternary ammonium chloride is tallow trimethyl ammonium chloride.

4. The blend of claim 1 wherein the fatty quaternary ammonium chloride is dicoco dimethyl ammonium chloride.

5. The blend of claim 1 wherein the fatty quaternary ammonium chloride is monococo trimethyl quaternary ammonium chloride.

6. The blend of claim 1 wherein the fatty quaternary ammonium chloride is tricaprylyl methyl ammonium chloride.

* * * * *